United States Patent [19]
Osterloh

[11] Patent Number: 5,279,367
[45] Date of Patent: Jan. 18, 1994

[54] FATTY ACID ADDITIVES FOR SURFACTANT FOAMING AGENTS

[75] Inventor: William T. Osterloh, Missouri City, Tex.

[73] Assignee: Texaco Inc., White Plains, N.Y.

[21] Appl. No.: 896,710

[22] Filed: Jun. 10, 1992

[51] Int. Cl.$^5$ .................... E21B 43/22; E21B 43/24
[52] U.S. Cl. .................... 166/272; 166/268; 166/275; 166/294; 166/309; 252/8.554
[58] Field of Search ............... 166/268, 272, 273, 274, 166/275, 294, 303, 305.1, 309; 252/8.554

[56] References Cited

U.S. PATENT DOCUMENTS

| | | | |
|---|---|---|---|
| 3,330,346 | 7/1967 | Jacobs et al. | 166/273 |
| 3,335,792 | 8/1967 | O'Brien et al. | 166/273 |
| 3,637,021 | 1/1972 | Hutchison et al. | 166/302 |
| 4,393,937 | 7/1983 | Dilgren et al. | 166/272 |
| 4,624,314 | 11/1986 | Clark | 166/274 X |
| 4,796,702 | 1/1989 | Scherubel | 166/309 X |
| 5,027,898 | 7/1991 | Naae | 166/272 |

Primary Examiner—George A. Suchfield
Attorney, Agent, or Firm—James L. Bailey; Kenneth R. Priem; Harold J. Delhommer

[57] ABSTRACT

The invention is a method for increasing the effectiveness of steam or carbon dioxide foaming operations for improving conformance during steam or carbon dioxide floods by adding to the surfactant foaming solution a fatty acid having about 12 to about 20 carbon atoms in a concentration such that the ratio of fatty acid to surfactant in the foaming solution is between about 1:4 and about 3:2.

8 Claims, 1 Drawing Sheet

FATTY ACID ADDITIVES FOR SURFACTANT FOAMING AGENTS

BACKGROUND OF THE INVENTION

The present invention relates to performance improving additives for surfactant foaming solutions which are injected in conjunction with steam or carbon dioxide floods to improve conformance.

When an oil reservoir is subjected to steam injection, steam tends to move up in the formation, whereas condensate and oil tends to move down due to the density difference between the fluids. Gradually, a steam override condition develops, in which the injected steam sweeps the upper portion of the formation but leaves the lower portion untouched. Injected steam will tend to follow the path of least resistance from the injection well to a production well. Thus, areas of high permeability will receive more and more of the injected steam which further raises the permeability of such areas. This phenomenon exists to an even larger degree with low injection rates and thick formations. The steam override problem worsens at greater radial distances from the injection well because steam flux decreases with increasing steam zone radius.

Although residual oil saturation in the steam swept region can be as low as 10%, the average residual oil saturation in the formation remains much higher due to poor vertical conformance. Thus it is because of the creation of steam override zones that vertical conformance in steam floods is usually poor.

A similar conformance problem exists with carbon dioxide flooding. Carbon dioxide has a large tendency to channel through oil in place since carbon dioxide viscosity may be 10 to 50 times lower than the viscosity of the oil in place. This problem of channeling through oil is exacerbated by the inherent tendency of a highly mobile fluid such as carbon dioxide to preferentially flow through more permeable rock sections. These two factors, unfavorable mobility ratios between carbon dioxide and the oil in place and the tendency of carbon dioxide to take advantage of permeability variations, often make carbon dioxide flooding uneconomical. Conformance problems increase as the miscibility of the carbon dioxide with the oil in place decreases.

Although not much attention has been devoted to carbon dioxide conformance, it has long been the concern of the oil industry to improve the conformance of a steam flood by reducing the permeability of the steam swept zone by various means. The injection of numerous chemicals such as foams, foaming solutions, gelling solutions or plugging or precipitating solutions have been tried. Because of the danger of damaging the reservoir, it is considered important to have a non-permanent means of lowering permeability in the steam override zones. For this reason, certain plugging agents are deemed not acceptable. In order to successfully divert steam and improve vertical conformance, the injected chemical should be (1) stable at high steam temperatures of about 300° to about 600° F., (2) effective in reducing permeability in steam swept zones, (3) non-damaging to the oil reservoir and (4) economical.

The literature is replete with references to various foaming agents which are employed to lower permeability in steam swept zones. The foaming agents of the prior art require the injection of a non-condensable gas to generate the foam in conjunction with the injection of steam and the foaming agent. U.S. Pat. Nos. 3,366,175 and 3,376,924 disclose the injection of a steam foam in a hydrocarbon reservoir at the interface between the hydrocarbons and the gas cap to aid in recovery. U.S. Pat. Nos. 3,410,344 and 3,994,345 disclose the use of a steam foaming agent selected from the generic groups of polyethoxyalkanols and alkylaryl sulfonates to reduce permeability in steam channels. The use of similar surfactants such as sodium lauryl sulfoacetate and alkyl polyethylene oxide sulfate are disclosed as foaming agents in carbon dioxide foams in U.S. Pat. Nos. 4,088,190 and 4,113,011, respectively. U.S. Pat. No. 4,018,278 discloses the use of sulfonated, ethoxylated alcohols or alkylphenols in surfactant flooding solutions without the use of steam.

Several trademarked foaming agents have been field tested by petroleum companies in steam floods. These include such trademarked chemicals as "STEPANFLOW 30", an alpha olefin sulfonate—sold by Stepan Chemical Co., "SUNTECH IV", a sulfonate—sold by Sun Oil, "THERMOPHOAM BWD", an alpha olefin sulfonate—sold by Farbest Co., "COR-180", a sulfonate—sold by Chemical Oil Recovery Co., and "SD1020", an alkyl toluene sulfonate sold by Chevron Inc. U.S. Pat. No. 4,086,964 disclosed the use of lignin sulfonates for a foaming agent and U.S. Pat. No. 4,393,937 discloses the use of alpha olefin sulfonates as a steam foaming agent. See also United Kingdom Patent No. 2,095,309 for a disclosure of alpha olefin sulfonate foaming agents.

Disclosures of laboratory and field tests of Stepanflo are contained in SPE Paper No. 10774 entitled "The Laboratory Development and Field Testing of Steam/-Noncondensable Gas Foams for Mobility Control in Heavy Oil Recovery" by Richard E. Dilgren et al. presented at the 1982 California Regional Meeting of the SPE held in San Francisco Mar. 25–26, 1982 and the Journal of Petroleum Technology, July, 1982 and page 1535 et seq. The same Journal of Petroleum Technology also discusses tests conducted on "THERMOPHOAM BWD". Additional information on tests of "THERMOPHOAM BWD" are also disclosed in Department of Energy Publications DOE/SF-10761-1, -2 and -3.

Tests of the "COR-180" foaming agent of Chemical Oil Recovery Co. are disclosed in SPE Paper No. 11806 entitled "Improvement in Sweep Efficiencies in Thermal Oil-Recovery Projects through the Application of In-Situ Foams" by R. L. Eson, presented at the International Symposium on Oil Field and Geothermal Chemistry in Denver, Jun. 1–3, 1983 and Department of Energy Reports No.s DOE/SF/10762-1, -2, -3.

U.S. Pat. Nos. 4,540,049; 4,540,050; and 4,577,688 disclose the injection of a group of novel steam foaming agents for injection with steam to decrease permeability in steam swept zones. The steam foaming agents have the general formula:

$$RO(R'O)_nR''SO_3M$$

where R is an alkyl radical, branched or linear, or an alkylbenzene, alkyltoluene or alkylxylene group, having from about 8 to about 24 carbon atoms in the alkyl chain, R' is ethyl, propyl or a mixture of ethyl and propyl, n has an average value of about 1 to about 20, R" is ethyl, propyl, hydroxypropyl or butyl and M is an alkali metal or ammonium ion.

U.S. Pat. No. 5,027,898 discloses novel lignin phenol surfactant compounds for use as steam foaming or carbon dioxide foaming agents in hydrocarbon recovery.

SUMMARY OF THE INVENTION

The invention is an improvement to surfactant foam injection methods used to improve conformance in steam or carbon dioxide floods. When such foams are used, a surfactant foaming solution is injected to foam within the formation and reduce the permeability of swept and partially swept zones, forcing steam or carbon dioxide into unswept zones. The improvement comprises adding a fatty acid having about 12 to about 20 carbon atoms to the surfactant foaming solution in a concentration such that the ratio of fatty acid to surfactant in the foaming solution is between about 1:4 and about 3:2.

DETAILED DESCRIPTION

Figure 1:
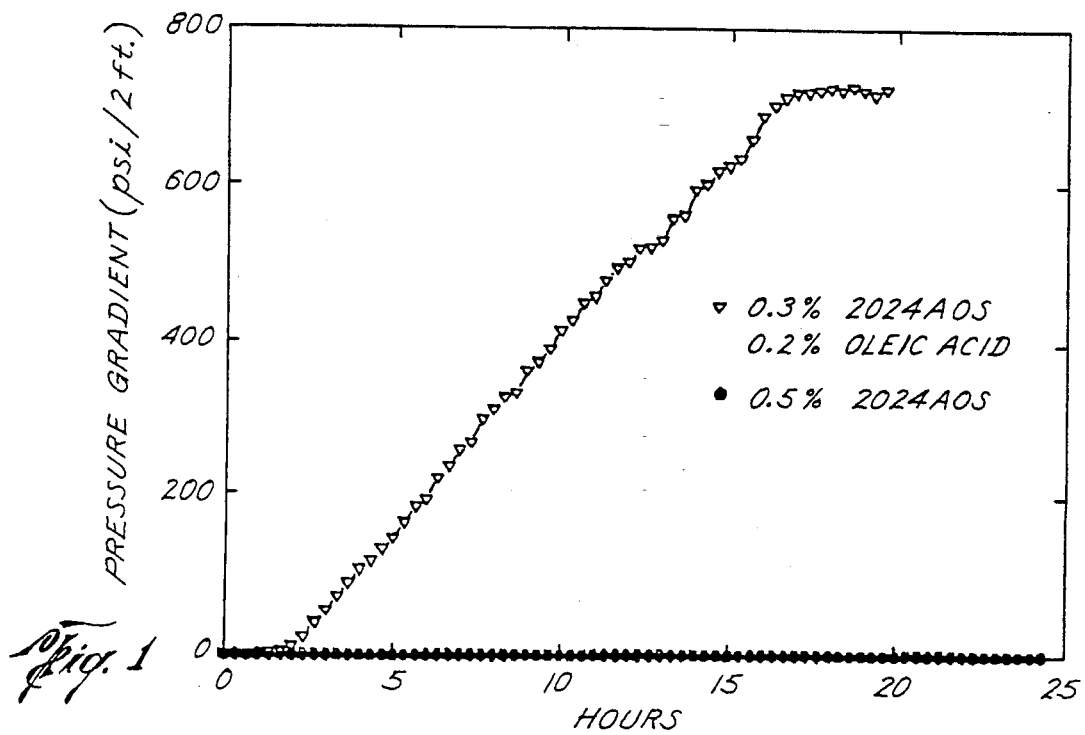
FIG. 1 is a graph illustrating the pressure gradient response of a commercial α-olefin sulfonate steam foaming agent with and without the addition of oleic acid.

The invention additives for use in conjunction with steam foaming agents or carbon dioxide foaming agents are highly effective in reducing the permeability of flood swept zones. The invention additives increase the foaming capability and diversion capability of steam and carbon dioxide foaming agents. They also permit a number of steam and carbon dioxide foaming agents that do not foam well in the presence of residual oil to form stable foams. Tests have indicated this to be true over a range of residual crude saturation of 6% to 30%. Thus, certain additives that heretofore have been very limited in application may be used to foam in areas having some oil saturation that have not been completely swept by the steam or carbon dioxide flooding medium. Another advantage of using the invention is that the cost of the injected chemicals is significantly lowered because part of the usually expensive surfactant foaming agent is replaced with a low cost fatty acid.

The novel additives of the present invention are fatty acids having between about 12 and about 20 carbon atoms. Preferably, the fatty acids are unsaturated. The saturated fatty acids have handling difficulties in that they are solids at room temperature. Solutions must be kept hot to prevent solidification causing the saturated fatty acid to fall out of solution. Oleic acid is the most preferred invention additive.

Dimers and trimers of the fatty acids may be used but have been discovered to be less effective than the fatty acid monomers. The creation of a dimer fatty acid causes a loss of polarity of the molecule. Both sides have a hydrophobic end and a hydrophilic end. It is believed this is the reason why some loss of performance has been noted in invention method tests employing dimers and trimers.

Chain lengths shorter than 12 carbon atoms are known to be less interfacially active. Thus, it is believed that the additive results would not be as good as those fatty acids within the invention carbon range of 12 to about 20.

The ratio of surfactant foaming agent to fatty acid is chosen such that the aqueous solution remains homogeneous at application temperature, salinity, and pH. Of course, depending upon the individual conditions and the foaming agent employed, the optimum ratio may vary significantly. Once the blend ratio range for homogeneous solutions is defined, the blend ratio should be further optimized within that range to determine what blend gives the fastest foam response under the application conditions. It is believed that the ratio of fatty acid to surfactant should be between about 1:4 and about 3:2, preferably between about 3:7 and about 1:1. In general, with a ratio higher than 3:2 of fatty acid to surfactant, there is probably not enough surfactant to keep the fatty acid solubilized.

It is preferred to maintain the pH of the foaming agent/fatty acid solution near neutral, or at least within the pH range of 6 to 8. The preferred solution pH of about 7 is approximately formation water pH for most underground hydrocarbon formations, which eliminates the difficulties of maintaining a different solution pH.

In carbon dioxide injection, however, formation pH will frequently drop as low as 3. This creates difficulties for the invention method. The lower pH decreases the solubility of the fatty acids. Additionally, the higher brine levels normally associated with carbon dioxide flooded formations also decrease fatty acid solubility. Under such circumstances, it is believed that the preferred fatty acid additives will be in the lower range of alkyl chain length of 12 to 14 carbon atoms.

There are two general classes of foaming agents commercially available for steam foaming and carbon dioxide foaming operations. These are α-olefin sulfonates and alkylaryl sulfonates. In laboratory tests, the fatty acid invention additive proved effective with both general types of foaming agents. It is believed that the invention additive method will also prove effective with other types of foaming agents known in the art including various alkoxysulfates, alkoxycarboxylates, and other sulfonates.

U.S. Pat. No. 5,027,898 discusses numerous variations of using steam and carbon dioxide foaming agents that are known in the art. The inventor is unaware of any reason why the invention method would inhibit the use of any of these variations in using steam and carbon dioxide foaming agents or why these variations would inhibit the use of the invention method.

The following examples will further illustrate the novel fatty acid additive method of the present invention for steam and carbon dioxide foaming agents. These examples are given by way of illustration and not as limitations on the scope of the invention. Thus, it should be understood that the composition and concentration of the additives may be varied to achieve similar results within the scope of the invention.

EXAMPLES

FIG. 1 illustrates the pressure gradient response obtained when a 0.5% by weight 20 to 24 carbon atom α-olefin sodium sulfonate (2024AOS) in Kern River softened water with a pH of 7 was injected with nitrogen gas at 150° C. into a sandpack. The nitrogen gas and surfactant had a superficial velocity of 10 meters per day in the 2 foot by 1.5 inch, 6 Darcy linear sandpack. The sandpack contained 0.06 pore volumes of heavy California crude, about 0.56 pore volumes of Kern River softened water and about 0.38 pore volumes of nitrogen. The Kern River softened water is relatively fresh, containing about 800 ppm Total Dissolved Solids (TDS) which includes about 320 ppm sodium chloride, about 320 ppm sodium bicarbonate, and about 160 ppm sodium sulfate.

No substantial pressure gradient was observed after injecting the surfactant and nitrogen for about 24 hours. This is noted as a solid line at the bottom of FIG. 1. Under identical conditions, this α-olefin sulfonate generated pressure gradients of up to 700 psi when the 0.06 pore volumes of heavy oil was excluded from the sand pack. These results indicated that the ability of this surfactant to generate foam was severely hindered by the presence of even small quantities of residual oil. obtained when 40% of the α-olefin sulfonate was replaced with oleic acid and solution pH adjusted to 7.0 with sodium hydroxide. Thus, the solution contained 0.3% of the α-olefin sulfonate and 0.2% oleic acid by weight. All other experimental conditions were identical. A rapid pressure gradient response was observed along with the attainment of a large steady state pressure gradient. These results indicate that the surfactant/oleic acid blend can generate substantial quantities of strong foam in the presence of crude oil.

Figure 2:
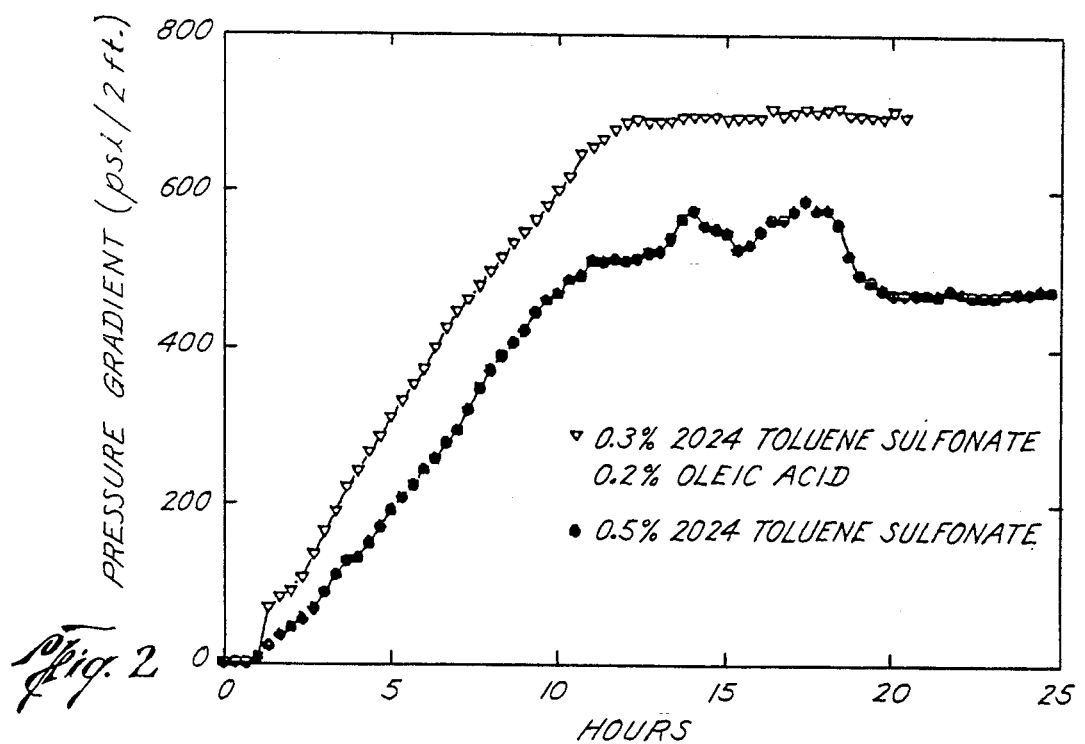
FIG. 2 is a graph illustrating the pressure gradient response of a commercial alkylaryl sulfonate steam foaming agent with and without the addition of oleic acid.

FIG. 2 illustrates the pressure gradient response obtained when a 0.5% by weight 20 to 24 carbon atom toluene sodium sulfonate (2024 toluene sulfonate) sold under the trademark "SD1020" by Chevron Inc. was injected into a sandpack under the same conditions as FIG. 1. The only difference other than surfactant was that the sandpack contained 0.3 pore volumes of the same heavy California crude, about 0.42 pore volumes of the Kern River softened water and about 0.28 pore volumes of nitrogen.

A substantial pressure gradient was observed along with a large steady state pressure gradient. This type of alkylaryl sulfonate foaming agent generates a strong foam in the presence of oil. When 40% of the "SD1020" surfactant was replaced with oleic acid to create a 0.3% SD1020 and 0.2% oleic acid by weight solution, and the solution pH adjusted to 7.0 with sodium hydroxide, the pressure gradient response was more rapid and substantially higher. These results indicate that fatty acids employed according to the invention can enhance the performance of foaming surfactants which are considered state of the art for steam and carbon dioxide foaming operations.

Many other variations and modifications may be made in the concepts described above by those skilled in the art without departing from the concepts of the present invention. Accordingly, it should be clearly understood that the concepts disclosed in the description are illustrative only and are not intended as limitations on the scope of the invention.

What is claimed is:

1. In a steam flood or carbon dioxide flood in an underground hydrocarbon formation, wherein a surfactant foaming solution is injected to foam and reduce the permeability of swept zones, forcing steam or carbon dioxide into unswept zones, the improvement which comprises:

adding a fatty acid having about 12 to about 20 carbon atoms to the surfactant foaming solution in a concentration such that the ratio of fatty acid to surfactant in the foaming solution is between about 1:4 and about 3:2.

2. The improvement of claim 1, wherein the fatty acid is an unsaturated fatty acid.

3. The improvement of claim 2, wherein the fatty acid is oleic acid.

4. The improvement of claim 1, wherein the ratio of fatty acid to surfactant is between about 3:7 and about 1:1.

5. The improvement in claim 1, wherein the surfactant is an α-olefin sulfonate.

6. The improvement in claim 1, wherein the surfactant is an alkylaryl sulfonate.

7. In a steam flood in an underground hydrocarbon formation, wherein a surfactant foaming solution is injected to foam and reduce the permeability of swept zones, forcing steam into unswept zones, the improvement which comprises:

adding oleic acid to the surfactant foaming solution in a concentration such that the ratio of oleic acid to surfactant in the foaming solution is between about 3:7 and about 1:1.

8. In a carbon dioxide flood in an underground hydrocarbon formation, wherein a surfactant foaming solution is injected to foam and reduce the permeability of swept zones, forcing carbon dioxide into unswept zones, the improvement which comprises:

adding a fatty acid having about 12 to about 16 carbon atoms to the surfactant foaming solution in a concentration such that the ratio of fatty acid to surfactant in the foaming solution is between about 3:7 and about 1:1.

* * * * *